(12) United States Patent
Gilbert et al.

(10) Patent No.: US 6,741,436 B2
(45) Date of Patent: May 25, 2004

(54) MICROPROCESSOR-CONTROLLED DC TO DC CONVERTER WITH FAULT PROTECTION

(75) Inventors: Stephen K Gilbert, Madison, AL (US); Qlingchuan Li, Madison, AL (US); David L Simpson, Jr., New Market, AL (US)

(73) Assignee: DaimlerChrysler Corporation, Auburn Hills, MI (US)

(*) Notice: Subject to any disclaimer, the term of this patent is extended or adjusted under 35 U.S.C. 154(b) by 64 days.

(21) Appl. No.: 10/034,216

(22) Filed: Dec. 20, 2001

(65) Prior Publication Data

US 2003/0117752 A1 Jun. 26, 2003

(51) Int. Cl.[7] .......................... H02H 7/10; H02H 11/00
(52) U.S. Cl. ........................................ 361/18; 361/21
(58) Field of Search .................. 361/18, 21; 363/21.18, 363/126, 150, 56.8, 67

(56) References Cited

U.S. PATENT DOCUMENTS

| | | | | |
|---|---|---|---|---|
| 5,001,399 A | * | 3/1991 | Layden | 315/105 |
| 5,264,780 A | * | 11/1993 | Bruer et al. | 323/222 |
| 5,534,771 A | * | 7/1996 | Massie | 323/285 |
| 5,680,034 A | * | 10/1997 | Redl | 323/21 |
| 6,392,384 B1 | * | 5/2002 | Hwang et al. | 320/116 |
| 6,404,655 B1 | * | 6/2002 | Welches | 363/41 |

OTHER PUBLICATIONS

Williams et al., Some Thoughts on DC–DC Converters, Application Note 29, Linear Technology Co., Oct., 1988.*
Nelson, LT1070 Design Manual, Application Note 19, Linear Technology Co.,Jun. 1986.*
Duane, Switch Mode Battery Eliminator Based on PIC16C72A, Application Note AN701, Mocrochip Technology, Inc., 1999.*
Palmer, Using the PWM, Application Note AN564, Mocrochip Technology Inc., 1997.*

* cited by examiner

Primary Examiner—Gregory J. Toatley, Jr.
Assistant Examiner—Z Kitov
(74) Attorney, Agent, or Firm—Ralph E. Smith

(57) ABSTRACT

A DC/DC converter features a programmable controller in a feedback control loop thereof. The programmable controller enables easy changes to operating parameters by reprogramming the controller's application software. Additionally, the converter features a hardware-implemented fault protection circuit which shuts down the converter's switching transistor upon controller failure.

12 Claims, 3 Drawing Sheets

MICROPROCESSOR-CONTROLLED DC TO DC CONVERTER WITH FAULT PROTECTION

BACKGROUND OF THE INVENTION

The invention generally pertains to voltage converters. More particularly, the invention concerns DC/DC voltage converters with fault protection.

Vacuum fluorescent displays (VFD's) used, for example, in automotive applications commonly require an input voltage that is greater than the DC voltage available from the vehicle battery or charging system. Typical vehicles provide approximately 14 to 15 volts DC, while it is not uncommon for VFD's used in radio, instrument cluster or other display device applications to require greater than 50 volts in order to operate properly. To provide such an increased voltage over that available from the automotive system in which the display is operating, a DC to DC boost converter is used. Such a converter "boosts" the voltage delivered to the display, such as a VFD, to a voltage greater than that of the vehicle supply.

Prior approaches to implementing DC to DC converters feature two basic methods of generating the required increased voltage. In a first prior approach, circuitry consisting of a switching regulator controller integrated circuit, also known as a DC to DC controller "IC" which generated a pulse width modulated (PWM) wave form was used to switch the input supply current through an inductor or transformer and to use the energy stored in the inductor or transformer to increase voltage delivered to the display to a level greater than the input supply voltage. Such prior DC to DC controller ICs also provided a feedback mechanism for monitoring the converter output voltage and adjusting the PWM waveform so as to regulate the voltage supplied to the converter output while maintaining proper operating voltages for which the circuit was designed. This conventional type of IC was specifically designed for DC to DC power supplies and typically included an oscillator, PWM generation circuitry, a feedback comparator circuit, and, in some cases, a switching transistor through which the inductor or transformer current was switched. This prior method operated at a fixed oscillation frequency set by discrete components and generated only a preselected output voltage. Any change in operating frequency or output voltage requirements dictated a change in the discrete components.

In a second prior approach, circuitry consisting of all discrete components with no integrated circuits generated a PWM waveform. The circuitry additionally implemented appropriate oscillator and feedback apparatus to control the switching of current through an inductor or transformer in such a way as to use the energy stored in the inductor or transformer to increase the voltage supplied to the converter output to a level greater than that of the supply voltage. This discrete circuitry additionally regulated the converter output voltage in accordance with design intents. This prior approach also operates at a fixed oscillator frequency and fixed output voltage, with any change in parametric operation requiring a change in the actual discrete circuit components.

Therefore, there is seen to be a need in the art for a DC/DC converter arranged in such a way that modifications to the desired operating characteristics can be carried out in a more facile manner.

SUMMARY OF THE INVENTION

Accordingly, a voltage converter comprises a direct current input voltage source, a voltage transforming element having an input coupled to the input voltage source and an output presenting a voltage signal thereon, a switching element coupled to the voltage transforming element for intermittently interrupting current flow from the input voltage source to the voltage transforming element, a converter output coupled to the output of the voltage transforming element via a rectifier and adapted to present a converter output voltage to a load, and a programmable controller having an input coupled to the converter output and an output coupled to the switching element, the programmable controller operative to control switching states of the switching element in accordance with preselected programmable operating parameters of the voltage converter.

In another aspect of the invention, a DC/DC voltage converter comprises a direct current input voltage source, a transformer having primary and secondary windings, the primary winding being coupled to the input voltage source, a switching transistor coupled to the primary winding and operative in a first switching state to allow current flow from the input voltage source through the primary winding and operative in a second switching state to inhibit said current flow, a converter output coupled to the transformer secondary winding via a rectification circuit and adapted to present a converter output voltage to a load, and a microprocessor-based controller having an input coupled to the rectification circuit and an output coupled to the switching transistor, the controller operative to selectively place the switching transistor in its first and second switching states in accordance with preselected, programmable operating parameters of the voltage converter.

BRIEF DESCRIPTION OF THE DRAWINGS

The objects and features of the invention will become apparent from a reading of a detailed description taken in conjunction with the drawing, in which.

DETAILED DESCRIPTION OF THE PREFERRED EMBODIMENTS

Figure 1:
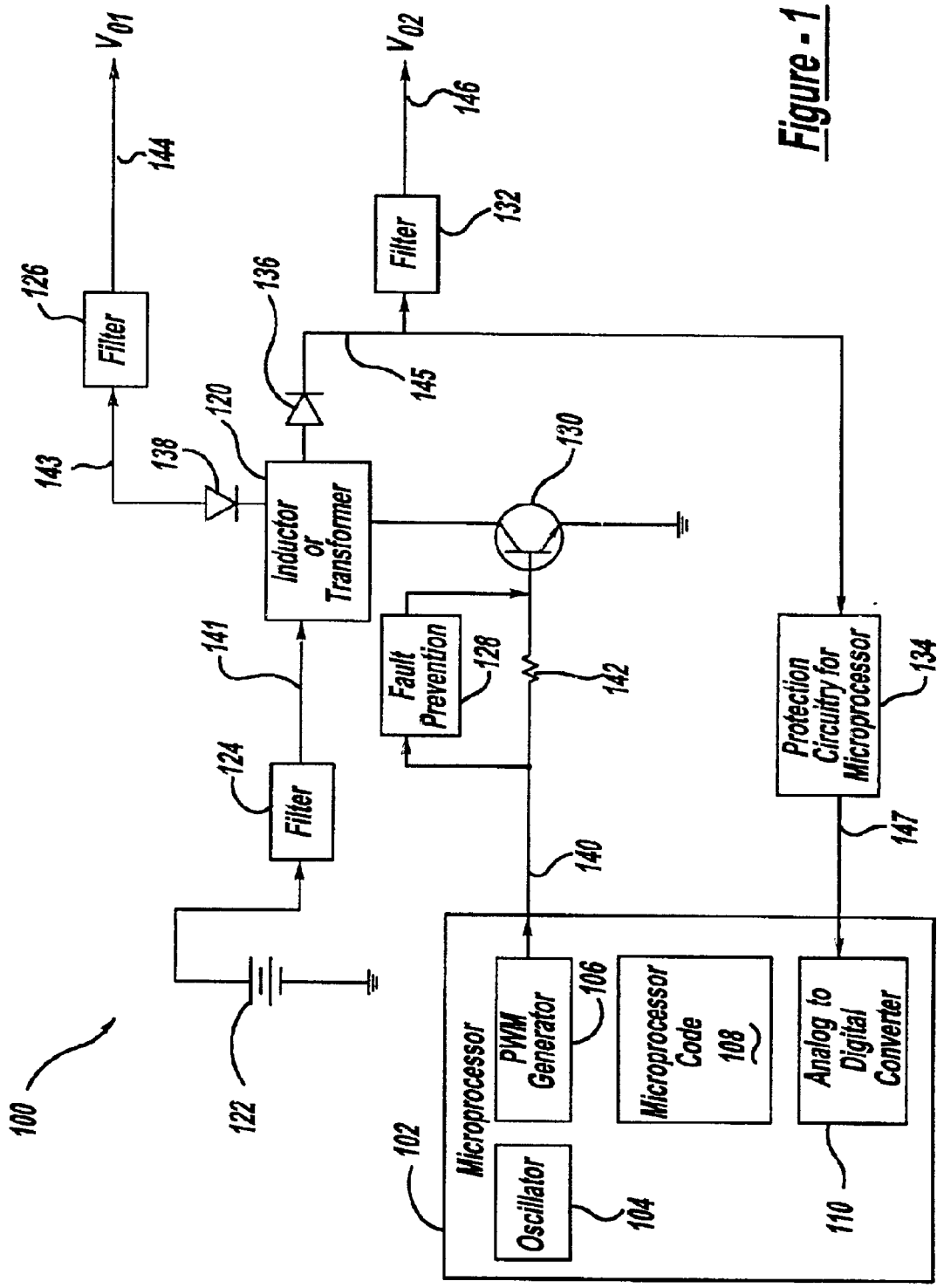
FIG. 1 is a block diagram of a converter arranged in accordance with the principles of the invention.

With reference to FIG. 1, a microprocessor controlled DC to DC converter with fault protection especially useful with automotive VFD's requires no application specific integrated circuit such as used in some prior approaches and allows the modification of both the operating frequency and the output voltage by changing only the microprocessor's application program. Most prior approaches to DC/DC conversion require discrete component changes to make such adjustments. With the present invention, it is not necessary to change discrete components to adjust operating frequency or voltage output. The invention also features a hardware fault prevention circuit that protects the converter from destruction due to a microprocessor malfunction. Additionally, the programmable controller incorporates software fault prevention to protect against catastrophic failure due to short circuits at the converter load.

With reference to FIG. 1, DC/DC converter 100 has an input coupled to an input direct current voltage source 122. The converter input is additionally coupled via filter network 124 to input 141 of inductor or transformer 120.

Another input to inductor or transformer 120 is coupled to the collector of switching transistor 130 which has its emitter coupled to ground potential. A programmable controller, such as a microprocessor-based controller 102, has a pulse width modulated output 140 coupled via resistor 142 to the base of switching transistor 130. Situated in parallel with resistor 142 is a fault prevention circuit 128.

Microprocessor 102 includes an oscillator 104, a pulse width modulation generator 106, microprocessor code 108 and an analog to digital converter 110 which has an input for receipt of an analog signal at controller input 147. Microprocessor 102 forms the basis of a feedback loop running from a rectified output of the inductor or transformer 120 via rectifying diode 136 and path 145 through a protection circuit 134 to input 147 of microprocessor controller 102.

A second output of the inductor or transformer 120 is coupled via a rectifying diode 138 to path 143 which presents a converter output $V_{O1}$ at lead 144 via filtering network 126. A second converter output voltage $V_{O2}$ is presented at output 146 via filter network 132 which is coupled to path 145 at the output of rectifier 136.

Figure 2:
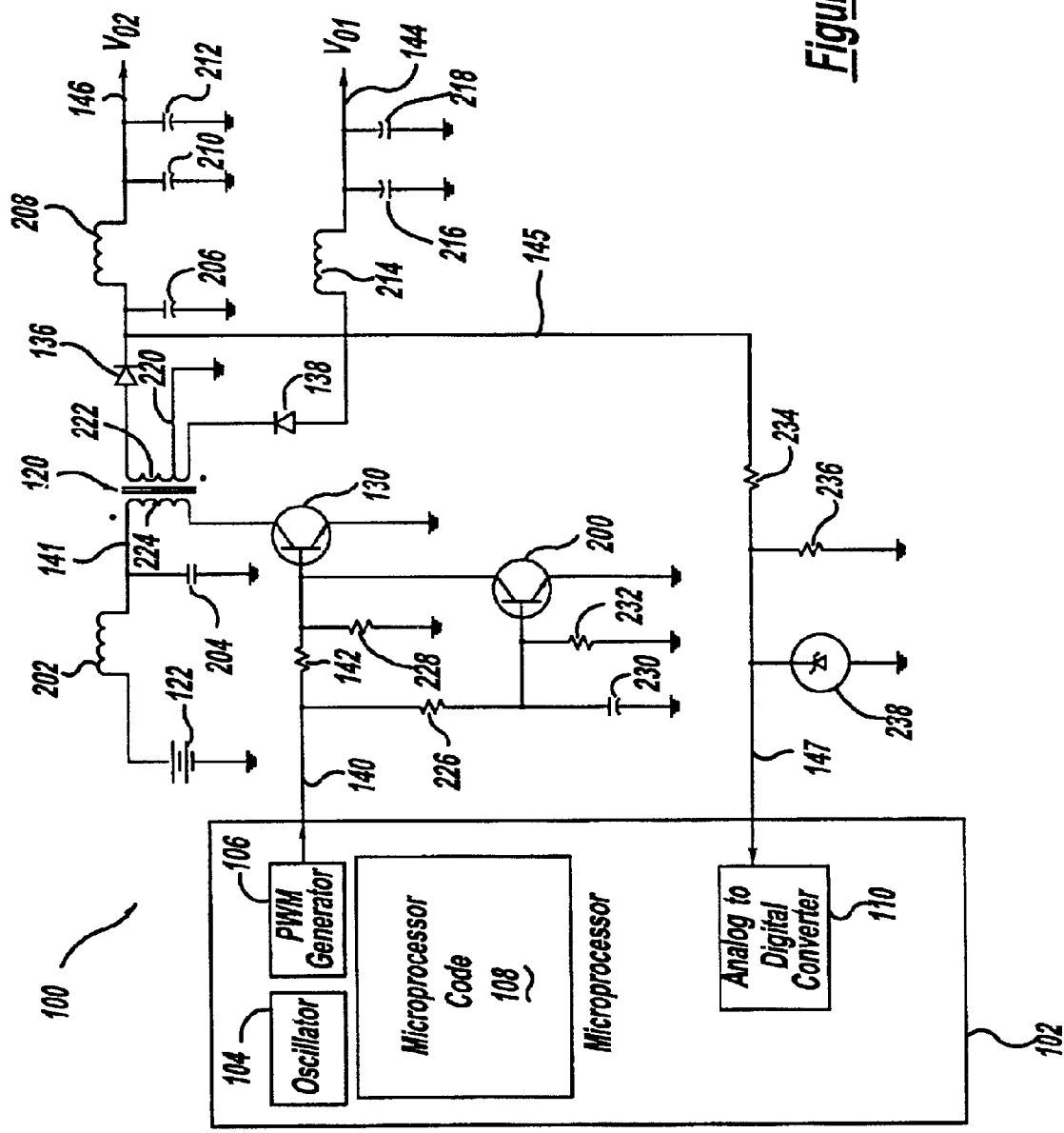
FIG. 2 is a circuit schematic of the converter of FIG. 1.

With reference to FIG. 2, circuitry details of many of the blocks set forth in FIG. 1 are presented. Components in FIG. 2 identical to those in the block diagram of FIG. 1 bear identical reference numerals. As seen from FIG. 2, in the specific example presented, the transforming element 120 of FIG. 1 utilizes a transformer 120 having a primary coil 224 and a secondary coil 222. Filter 124 of FIG. 1 is comprised, as shown in FIG. 2, of inductor 202 and capacitor 204. Fault prevention circuit 128 of FIG. 1 is comprised of resistors 226, 228 and 232, along with capacitor 230 and shunting transistor 200.

The microprocessor protection circuitry 134 of FIG. 1 is comprised as seen in FIG. 2 of Zener diode 238 and resistors 234 and 236. Smoothing filter 126 of FIG. 1 is comprised of inductor 214, and capacitors 216 and 218. Finally, smoothing filter 132 of FIG. 1 is comprised of inductor 208 and capacitors 206, 210 and 212.

With further reference to FIG. 2, a first converter output voltage $V_{O1}$ and a second converter output voltage $V_{O2}$ are provided from the secondary winding of transformer 120 by utilizing a secondary coil tap 220 in conjunction with rectifying elements 136 and 138. In the specific embodiment shown in FIG. 2, the $V_{O2}$ output is a positive voltage that is greater than the voltage of power supply 122, while converter output $V_{O1}$ is a negative voltage output. Two such outputs of differing polarity may optionally be provided by converters designed in accordance with the invention for those applications where the VFD's of differing specification are used, some requiring a positive voltage and some requiring a negative drive voltage.

With continued reference to FIGS. 1 and 2, the converter of the invention, operates as follows. When microprocessor 102 is powered up, a pre-programmed frequency and duty cycle for the pulse width modulator 106 is read from microprocessor code memory 108. This results in microprocessor 102 outputting a pulse width modulated waveform at controller output 140 to a node formed by the junction of resistors 142 and 226. Resistors 142 and 228 form a voltage divider to reduce the voltage output from the microprocessor 102 (typically 5 volts or 3.3 volts depending on the microprocessor design technology) to a proper level required for acceptable base drive to transistor 130.

Transistor 130 is a switching element which switches the current and transformer 120 primary 224 at a frequency and duty cycle matching the microprocessor's PWM output 140.

The input of transformer 120 is connected to the vehicle's power supply 122 (typically 8 volts to 16 volts DC) through filter components, inductor 202 and capacitor 204.

As the current through the primary 224 is switched by transistor 130, voltage amplification occurs across the secondary 222 at an amplitude relative to the turns ratio of the transformer 120 and to the frequency and duty cycle of the PWM output signal on lead 140 from microprocessor 102. The positive output voltage from transformer 120 is rectified by diode 136 and smoothed by the filter network consisting of capacitors 206, 210 and 212 and inductor 208 arranged as shown in FIG. 2. The converter output $V_{O2}$ is fed, for example, or adapted to be coupled to, a VFD such as those requiring a positive DC voltage $V_{O2}$ greater than the vehicle supply voltage 122.

If a negative DC supply voltage is required for the VFD in use or other converter load, as is the case for many automotive displays, such a negative output voltage $V_{O1}$ is generated by grounding the secondary 222 of transformer 120 at an appropriate tap point 220, such that the turns ratio gives the desired negative voltage. While possible, the generation of a negative voltage is not necessary for the operation of the invention. If the negative voltage $V_{O1}$ is required, rectifier 138 provides rectification for the negative voltage and filter components comprising inductor 214 and capacitors 216 and 218 provide smoothing for the negative voltage output $V_{O1}$.

The positive rectified output voltage $V_{O2}$ from diode 136 also feeds a voltage divider formed by resistors 234 and 236 and is then fed to the analog to digital input 147 of the microprocessor 102 as the feedback voltage for the DC to DC converter. This feedback voltage varies linearly in proportion to changes in the converter's DC output voltage. Zener diode 238 is selected to provide a voltage clamp to insure that the input voltage to the microprocessor's analog to digital input 147 never exceeds a safe operating voltage limit of microprocessor 102.

The complete feedback loop for the converter 100 consists of resistors 234, 236, diode 238 and analog to digital converter 110. Control code of microprocessor 102 as stored in code memory 108 and the PWM output 140 of microprocessor 102 complete the feedback loop. Such utilization of a programmable controller such as microprocessor 102 in the DC to DC converter 100 feedback loop provides marked flexibility when compared to prior art approaches.

The circuitry comprising transistor 200 along with resistors 226, 232 and capacitor 230 implements a hardware fault prevention circuit 128 (FIG. 1) which protects the converter 100 from a microprocessor malfunction. Without this circuit in place, if microprocessor 102 malfunctions and causes the PWM output 140 to be held in a constant "high" state, transistor 130 would be constantly conducting and providing a path to ground from the vehicle supply voltage through transformer 120. Such constant conduction would eventually cause either transistor 130 or transformer 120 to be overstressed and to catastrophically fail. With the hardware fault protection circuitry 128 in place, if microprocessor PWM output 140 pulse rate starts decreasing below a rate determined by the time constant formed by resistor 226, 232 and capacitor 230, then shunting transistor 200 will begin to conduct and will reduce the base current drive delivered to transistor 130. This, in turn, will decrease the collector current of transistor 130 and will prevent failure of transistor 130 or transformer 120.

If the PWM output 140 happens to go to a constant "high" state, shunting transistor 200 would turn completely on and cause transistor 130 base current to drop to a level that would cause transistor 130 to go into cutoff or nonconduction from its collector to emitter circuitry. Hence, no current would flow in either transistor 130 or transformer 120 and both would be protected.

Figure 3:
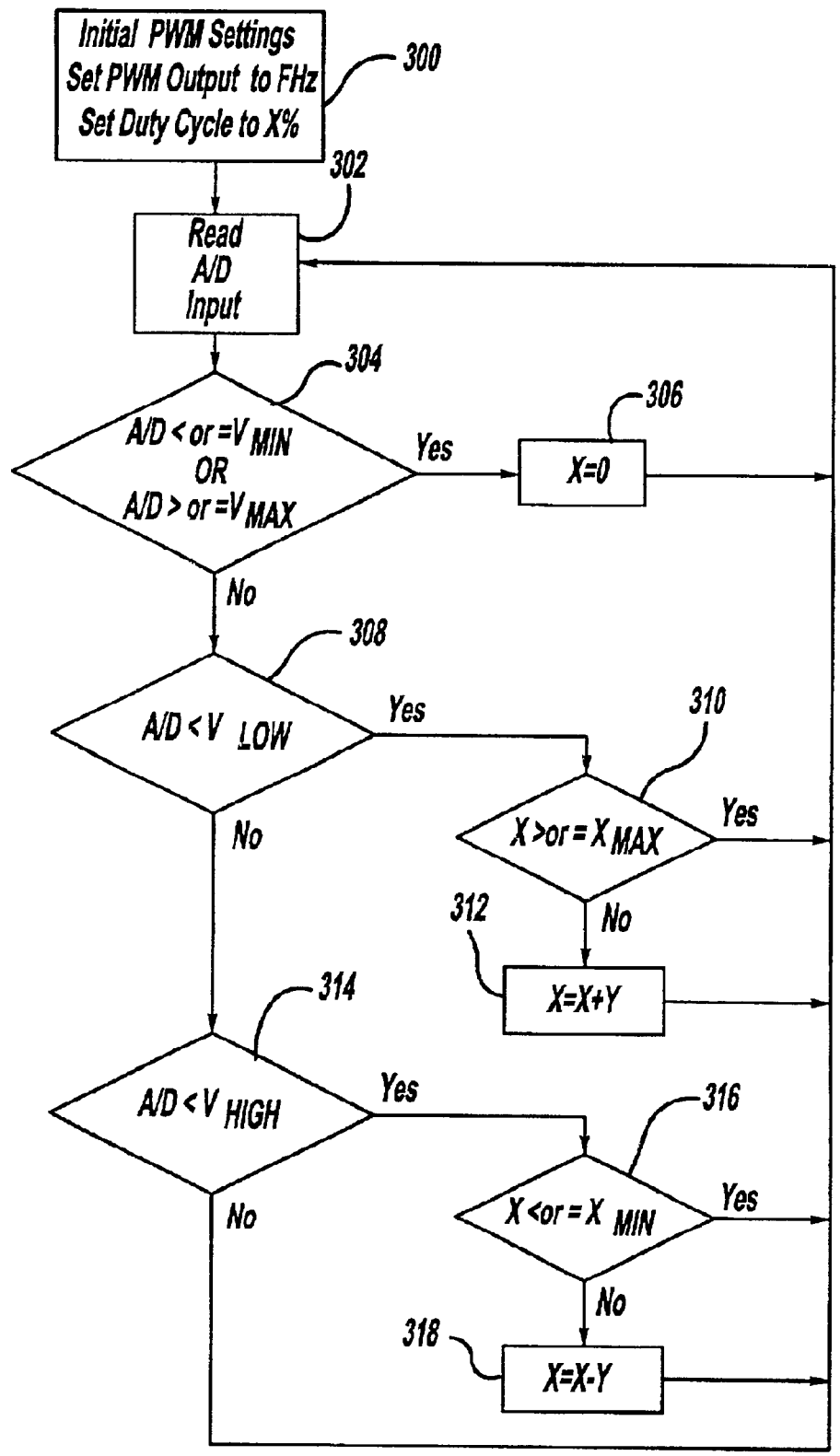
FIG. 3 is a flow chart describing the programmable regulation routine of the converter output by the microprocessor-based controller arranged in accordance with the principles of the invention.

The operation of the microprocessor control software held in code memory 108 is presented in the flow chart diagram in FIG. 3. With reference to FIG. 3, upon initial power application at block 300, microprocessor 102 sets the PWM output 140 frequency to FHz, the operation frequency for which transformer 120 has been designed. Microprocessor 102 sets the PWM output 140 duty cycle to X %, an experimentally determined duty cycle that produces an output voltage close to the desired regulated output voltage for a given converter load.

The feedback voltage applied to the analog to digital input 147 is derived from the converter output voltage and varies linearly with changes in the output voltage. After initialization, microprocessor 102 reads the feedback voltage on the analog to digital input 147 at block 302.

At decision block 304, if the feedback voltage is lower than a minimum voltage threshold $V_{MIN}$ it is an indication that the output of converter 100 is being loaded too heavily. The PWM output duty cycle is then reduced to 0% at block 306, which reduces the converter output voltage to 0 volts, thereby preventing damage to transformer 120 or switching transistor 130.

If the feedback voltage is greater than a maximum voltage threshold, $V_{MAX}$, it is an indication of either a duty cycle error or insufficient output loading at the converter output. The PWM output 147 is then reduced to 0% preventing damage to the VFD module or other devices being driven by the converter output $V_{o1}$ or $V_{o2}$. The routine then returns to block 302.

If the feedback voltage is determined to be within the safe operation limits, $V_{MIN}$ and $V_{MAX}$ at block 304, microprocessor 102 then determines if the feedback voltage is within the regulation limits, $V_{LOW}$ and $V_{HIGH}$ at decision blocks 308 and 314, respectively. If the feedback voltage is within the regulation limits, no converter output voltage adjustment is necessary, and therefore, microprocessor 102 returns to the analog to digital input read for a new feedback voltage reading at block 302.

If the feedback voltage is less than the lower regulation limit, $V_{LOW}$, it is an indication that the converter output voltage is too low. Microprocessor 102 then compares the PWM output duty cycle, X, to the maximum allowable duty cycle, $X_{MAX}$ at decision block 310. If the duty cycle percentage is less than $X_{MAX}$, microprocessor 102 increases the PWM duty cycle by Y % at block 312, causing a slight increase in the converter output voltage. The microprocessor 102 then returns to the analog to digital input read for a new feedback voltage reading at block 302.

If the duty cycle is greater than $X_{MAX}$, it is an indication that the converter output current is being limited by the energy transfer characteristics of the transforming element 120, and also indicates that increasing the duty cycle further will not produce a proportional increase in the converter output voltage. Therefore, the microprocessor 102 returns to the analog to digital input read at block 302 with no change to the PWM duty cycle.

If the feedback voltage is greater than the upper regulation limit, $V_{HIGH}$, as determined at decision block 314, it is an indication that the converter output voltage is too high. Microprocessor 102 then compares the PWM output duty cycle, X, to the minimum allowable duty cycle, $X_{MIN}$ at decision block 316. If the duty cycle percentage is greater than $X_{MIN}$, microprocessor 102 decreases the PWM duty cycle by Y % at block 318 causing a slight decrease in the converter output voltage. Microprocessor 102 then returns to the analog to digital read 302 for a new feedback voltage reading. If the duty cycle is less than $X_{MIN}$, it is an indication that further reduction of the duty cycle will produce a 0% duty cycle, reducing the converter output voltage to 0. Microprocessor 102 therefore returns to the analog to digital input read function at block 302.

Hence, it is seen that the invention provides a marked advantage over the prior art in offering ease of design flexibility by simple changes to microprocessor control code. The converter output voltage may be disabled by turning off the pulse width modulated output of the programmable controller. The frequency of operation may be varied within the limits of the transformer design by changing the frequency variable, F. The regulated output voltage may be varied to cover a range of applications, such as different VFD's, by changing the initial duty cycle setting, X, and the regulation limits, $V_{LOW}$ and $V_{HIGH}$. The resolution of the output voltage correction may also be varied by changing the duty cycle increment/decrement variable, Y.

The invention has been described with reference to a specific embodiment which is to be taken for the sake of example only. The scope and spirit of the invention is to be determined from a proper interpretation of the appended claims.

What is claimed is:

1. A voltage converter comprising:
   a direct current input voltage source;
   a voltage transforming element having an input coupled to the input voltage source and an output presenting a voltage signal thereon;
   a switching element coupled to the voltage transforming element for intermittently interrupting current flow from the input voltage source to the voltage transforming element;
   a converter output coupled to the, output of the voltage transforming element via a rectifier and adapted to present a converter output voltage to a load; and
   a programmable controller having an input coupled to the converter output and an output coupled to the switching element, the programmable controller operative to control switching states of the switching element in accordance with preselected, programmable operating parameters of the voltage converter; and
   a fault prevention circuit coupled between the programmable controller output and the switching element, the fault prevention circuit including a shunting element operative to disable one of the switching states of the switching element upon an occurrence of a controller fault.

2. The converter of claim 1 further comprising a supplemental voltage transforming element output coupled via a supplemental rectifier to a supplemental converter output adapted to present a supplemental converter output voltage to a supplemental load, wherein the supplemental converter output voltage is different from the converter output voltage.

3. The converter of claim 1 wherein the programmable controller controls the switching states of the switching element via a pulse-width-modulated switching signal.

4. The converter of claim 1 further comprising programmable controller protection circuitry coupled between the converter output and the programmable controller input.

5. The converter of claim 1 wherein the converter output is adapted to be coupled to a vacuum fluorescent display.

6. The converter of claim 2, wherein the supplemental converter output is adapted to be coupled to a vacuum fluorescent display.

7. A DC/DC voltage converter comprising:

a direct current input voltage source;

a transformer having primary and secondary windings, the primary winding being coupled to the input voltage source;

a switching transistor coupled to the primary winding and operative in a first switching state to allow current flow from the input voltage source through the primary winding and operative in a second switching state to inhibit said current flow;

a converter output coupled to the transformer's secondary winding via a rectification circuit and adapted to present a converter output voltage to a load; and a microprocessor-based controller having an input coupled to the rectification circuit and an output coupled to the switching transistor, the controller operative to selectively place the switching transistor in its first and second switching states in accordance with preselected, programmable operating parameters of the voltage converter; and a fault prevention circuit coupled to the controller output and to the switching transistor, the fault protection circuit including a shunting transistor operative to divert base drive current from the switching transistor upon the occurrence of a controller fault.

8. The converter of claim 7 further comprising a Zener diode voltage clamp coupled to the controller input to maintain voltage input to the controller within preselected limits.

9. The converter of claim 7 wherein the controller selectively places the switching transistor in its first and second switching slates in accordance with a pulse width modulated signal on the controller output.

10. In a voltage converter using a voltage transforming element coupled to a switching element for allowing current flow through the voltage transforming element in a first switching state and for inhibiting current flow through the voltage transforming element in a second state and a control element operative to selectively place the switching element into its first and second switching states, a fault protection circuit comprising:

a current shunt switch coupled to the switching element end operative to hold the switching element in its second state upon an occurrence of a control element fault.

11. The fault protection circuit of claim 10 wherein the switching element and the current shunt switch each comprise transistors, the current shunt switch transistor coupled to a base drive circuit of the switching element transistor such that base drive current to the switching element transistor is diverted through the current shunt switch translator whenever the current shunt switch translator goes into a conductive state.

12. The fault protection circuit of claim 11 further comprising a timing circuit coupled between an output of the control element and a base electrode of the current shunt switch transistor, the timing circuit operative to provide base drive current to the current shunt switch transistor whenever a pulse rate of a control signal at the control element output falls below a predetermined value.

* * * * *

UNITED STATES PATENT AND TRADEMARK OFFICE
CERTIFICATE OF CORRECTION

PATENT NO.    : 6,741,436 B2
DATED         : May 25, 2004
INVENTOR(S)   : Gilbert et al.

It is certified that error appears in the above-identified patent and that said Letters Patent is hereby corrected as shown below:

<u>Title page,</u>
Item [*] Notice, delete "bydays.days." and insert -- by 64 days. --

Signed and Sealed this

Nineteenth Day of April, 2005

JON W. DUDAS
*Director of the United States Patent and Trademark Office*